US010991128B2

(12) United States Patent
Glazberg et al.

(10) Patent No.: US 10,991,128 B2
(45) Date of Patent: Apr. 27, 2021

(54) MARKERS FOR AUGMENTED REALITY

(71) Applicant: Shmuel Ur Innovation LTD., Shorashim (IL)

(72) Inventors: Ziv Glazberg, Haifa (IL); Shmuel Ur, Shorashim (IL); Nahum Nir, Jerusalem (IL)

(73) Assignee: Shmuel Ur Innovation LTD., Shorashim (IL)

( * ) Notice: Subject to any disclaimer, the term of this patent is extended or adjusted under 35 U.S.C. 154(b) by 0 days.

(21) Appl. No.: 16/433,009

(22) Filed: Jun. 6, 2019

(65) Prior Publication Data
US 2020/0388056 A1 Dec. 10, 2020

(51) Int. Cl.
| | |
|---|---|
| *G06T 19/00* | (2011.01) |
| *G06T 19/20* | (2011.01) |
| *G06K 9/46* | (2006.01) |
| *G06F 21/62* | (2013.01) |
| *G06T 11/00* | (2006.01) |
| *G06F 16/58* | (2019.01) |
| *G06K 9/00* | (2006.01) |

(52) U.S. Cl.
CPC .......... *G06T 11/00* (2013.01); *G06F 16/5866* (2019.01); *G06F 21/629* (2013.01); *G06K 9/46* (2013.01); *G06T 19/006* (2013.01); *G06T 19/20* (2013.01); *G06K 9/00221* (2013.01); *G06T 2210/08* (2013.01); *G06T 2219/2024* (2013.01)

(58) Field of Classification Search
CPC .. G06F 16/5866; G06K 9/46; G06K 9/00268; G06T 19/006
See application file for complete search history.

(56) References Cited

U.S. PATENT DOCUMENTS

| | | | |
|---|---|---|---|
| 10,614,635 B1* | 4/2020 | Walters | G06T 7/90 |
| 2016/0240004 A1* | 8/2016 | Ur | G06T 19/20 |
| 2016/0240005 A1* | 8/2016 | Ur | G06Q 50/01 |
| 2016/0240006 A1* | 8/2016 | Ur | G06F 3/04842 |
| 2016/0253841 A1* | 9/2016 | Ur | G06T 19/20 |
| | | | 345/633 |
| 2018/0129838 A1* | 5/2018 | Nguyen | G06Q 50/28 |
| 2019/0035153 A1* | 1/2019 | Dange | G06K 9/00228 |

* cited by examiner

*Primary Examiner* — Jin Cheng Wang

(57) ABSTRACT

A method, apparatus and product for utilizing markers for augmented reality. The apparatus comprising: a frame sensor configured to obtain a frame, wherein the frame is associated with a field of view of a user; a processor configured to: execute an augmented reality framework, wherein the augmented reality framework is configured to invoke at least one skin to compute an augmented reality display for the user; wherein the augmented reality framework is configured to identify a marker in the frame, wherein in response to identifying the marker, altering functionality of the augmented reality framework.

20 Claims, 8 Drawing Sheets

MARKERS FOR AUGMENTED REALITY

TECHNICAL FIELD

The present disclosure relates to computer systems in general, and to Augmented Reality (AR), in particular.

BACKGROUND

Currently AR has not yet fulfilled the expectations. Lack of Internet Protocols (IP) that can support the high bandwidth and low latency requirements as well as privacy concerns of people are holding wide adoption.

Augmented reality (AR) is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment.

In order to facilitate AR applications, processing may be performed in external devices other than the AR device. However, significant bandwidth resources may be required in order to upload, in real-time, streams of frames to be analyzed.

BRIEF SUMMARY

One exemplary embodiment of the disclosed subject matter is an apparatus comprising: a frame sensor configured to obtain a frame, wherein the frame is associated with a field of view of a user; a processor configured to: execute an augmented reality framework, wherein the augmented reality framework is configured to invoke at least one skin to compute an augmented reality display for the user; wherein the augmented reality framework is configured to identify a marker in the frame, wherein in response to identifying the marker, altering functionality of the augmented reality framework.

Optionally, altering the functionality of the augmented reality framework comprises imposing a restriction on the at least one skin.

Optionally, the augmented reality framework is configured to identify a second marker in the frame or in another frame obtained by said frame sensor; and wherein in response to the augmented reality framework identifying the second marker, lifting the restriction.

Optionally, the restriction is selected from the group consisting of: a restriction preventing execution of the at least one skin in a remote device external to said apparatus; a restriction requiring execution of the at least one skin in a predetermined edge device external to said apparatus; a restriction preventing execution of the at least one skin while said apparatus is located in a predetermined location; a restriction preventing execution of the at least one skin for a predetermined time duration; and a restriction preventing applying functionality of facial recognition of the at least one skin on a person.

Optionally, the apparatus further comprising a signaling module configured to provide sensory signal, wherein said signaling module is configured to provide a signal indicative of the restriction being imposed by the augmented reality framework.

Optionally, said apparatus comprising a transmitter configured to transmit the frame; wherein the augmented reality framework is operatively coupled to said transmitter, wherein said altering the functionality comprises preventing transmission of the frame or portion thereof using said transmitter.

Optionally, the marker is associated with a marked object; wherein said altering functionality of the augmented reality framework comprises preventing the at least one skin from processing the marked object or retaining the marked object.

Optionally, said altering the functionality of the augmented reality framework comprises invoking a second skin, wherein the second skin is associated with the marker.

Optionally, the marker is not visible to a human eye.

Optionally, said apparatus is embedded, at least partially, in augmented reality glasses or in augmented reality lenses.

Another exemplary embodiment of the disclosed subject matter is a method comprising: obtaining a first frame associated with a view of a user using an Augmented Reality (AR) device; determining a first overlay display for the first frame, wherein the first overlay display is displayed to the user by the AR device, wherein said determining the first overlay display comprises executing a skin on the first frame, whereby performing a functionality on the first frame; identifying a marker in the second frame; in response to said identifying, determining an altered functionality; obtaining a second frame; and determining a second overlay display for the second frame, wherein the second overlay display is displayed to the user using the AR device, wherein determining the second overlay display comprises performing the altered functionality with respect to the second frame.

Optionally, the method comprises determining a plurality of overlay displays for a stream of frames, wherein the stream of frames comprises one or more frames that are consecutive to the second frame, wherein said determining the plurality of overlay displays comprises performing the altered functionality with respect to each frame of the stream.

Optionally, the marker is associated with an object, wherein the marker conveys an imposed restriction with respect to the object; and wherein said performing the altered functionality comprises imposing the imposed restriction on the skin.

Optionally, determining, based on the marker, a terminating condition, wherein in response to the terminating condition occurring, restoring the functionality instead of the altered functionality.

Optionally, the terminating conditions is at least one of: the AR device reaching a predetermined location; an elapsed time duration; and the AR framework capturing a second marker.

Optionally, the method further comprises in response to said identifying, requesting physical access to a restricted area, wherein said requesting comprises a notification that the functionality was altered; whereby physical access is granted automatically based on the notification.

Optionally, the altered functionality comprises restricting performing of a modification to an object appearing in a frame.

Optionally, the altered functionality comprises requiring execution of a predetermined skin, wherein the predetermined skin is selected from the group consisting of a redacting skin configured to redact from the user's view portions of the frame and an authority skin controlled by an entity controlling an area associated with the marker.

Optionally, said determining the altered functionality comprises: providing to the user a suggestion to activate a predetermined skin; in response to a user confirmation, activating the predetermined skin, whereby the altered functionality comprises executing the predetermined skin.

Optionally, the augmented reality framework is configured to analyze the frame to identify one or more objects in the frame, wherein the at least one skin is registered on one or more object types in the augmented reality framework, whereby the augmented reality framework is configured to invoke the at least one skin in response to identifying an object of the one or more object types in the frame.

Yet another exemplary embodiment of the disclosed subject matter is a computer program product comprising non-transitory computer readable medium retaining instructions, the instructions configured to cause a processor, when executing the instructions to perform: obtaining a first frame associated with a view of a user using an Augmented Reality (AR) device; determining a first overlay display for the first frame, wherein the first overlay display is displayed to the user by the AR device, wherein said determining the first overlay display comprises executing a skin on the first frame, whereby performing a functionality on the first frame; identifying a marker in the second frame; in response to said identifying, determining an altered functionality; obtaining a second frame; and determining a second overlay display for the second frame, wherein the second overlay display is displayed to the user using the AR device, wherein determining the second overlay display comprises performing the altered functionality with respect to the second frame.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
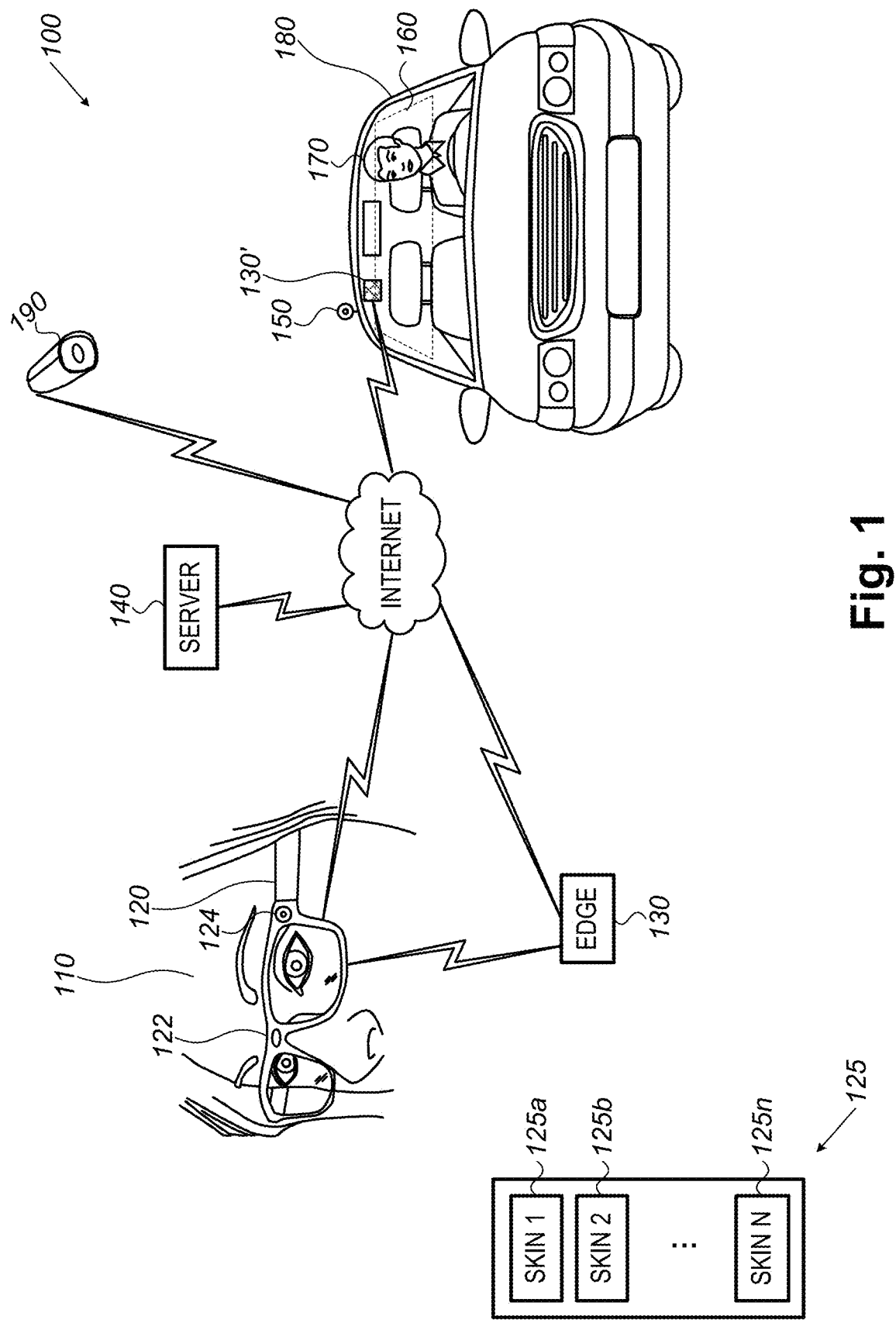
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to impose restrictions on an AR framework that is executing a skin. In some exemplary embodiments, a skin may be a software executed by an AR framework. A skin may register on an object in order to augment the object, such as in a destructive or in a constructive manner. In some exemplary embodiments, a skin may be executed locally on an AR device, such as for example AR glasses, Head-Up Display (HUD), an augmented windshield, or the like, on a nearby edge computer, on a cloud server, or the like. In some exemplary embodiments, the AR device may have relatively fewer resources than external devices. For example, the AR device may have limited power supply, limited computational resources, or the like. The edge computer may be an external device that is relatively close to the AR device, such as a computer directly paired with the AR device, a computer in the same local network as the AR device, or the like. The edge computer may be, for example, a local computer at the user's residence, a computer installed at the vehicle that the user is using, a server in a shopping mall where the user is located, a mobile device of the user, or the like. It is noted that as the edge computer is physically close to the AR device, communication latency therebetween is relatively lower than latency to a cloud server. In some exemplary embodiments, different entities may control different devices. For example, the user may own and control the AR device, the edge computer but not the cloud server. In another example, the user may not control the AR device, which may be rented. As yet another example, the edge computer may be controlled by a different entity, such as the owner of premises, an owner of the vehicle, or the like.

In some exemplary embodiments, a frame sensor that is associated with an AR framework may obtain sensitive images such as people that are not fully dressed, images of minors, or the like. It may be desired to process such images in a restricted computerized environment. Additionally or alternatively, the computerized environment executing a skin may be configured to obtain data regarding skins that a user is using and provide the data to a third party.

In some exemplary embodiments, it may be desired to allow people to impose restrictions on the AR frameworks, such as a restriction not to process their images. In some exemplary embodiments, an AR framework may add paintings to people's images, undress them, or the like. As people may not have control on who is taking their images, it may be desired to signal AR framework not to process their images.

Additionally or alternatively, the restriction may be a restriction regarding storing images of bystanders and other people that are not the users of the AR framework and whose image is captured and analyzed by the AR framework. As an example, someone may be in a video chat with her boyfriend. She may feel comfortable that the AR framework of her boyfriend will add to her image a mustache, but may not feel comfortable that the chat, or a portion thereof, will be stored for future use. In some cases, frames may be stored and processed for future purposes, and the bystander may wish to indicate her refusal to allow storage of her images.

Additionally or alternatively, local restrictions may be imposed on AR frameworks. As an example, in case of hospitals, security areas, or the like, it may be desired to impose restriction on AR frameworks while the AR device is within the restricted premises. The restriction may prevent the AR framework from processing some images, storing images of certain areas or objects, transmitting information to a computer external to the premises, manipulating display or portion thereof, either in constructive or destructive manner, or the like. In some exemplary embodiments, the restriction may require that the processing be performed on a trusted computerized environment, such as an edge computer owned by the proprietor of the premises, or the like.

Additionally or alternatively, temporal restrictions may be imposed on the AR framework. As an example, in a court room, it may be desired to impose restrictions on AR frameworks while the court is in session.

Additionally or alternatively, a bystander may wish to prevent the AR framework from identifying personal information regarding her. For example, the bystander may wish to signal the AR framework not to use facial recognition algorithms on her image, so as to prevent any executed skin from identifying her using such technique.

Additionally or alternatively, people may want to set a privacy restriction on AR devices that they do not own but are taking their images. In some exemplary embodiments, a person may be worried that an AR device is performing non-legitimate operations with respect to his appearance and may wish to ensure that the AR device is restricted from performing such operations thereon.

One technical solution is to configure an AR framework to identify a marker. A marker may be an object, an image, or the like, that is sensed by the sensors of the AR framework and which conveys information to the AR framework. The marker may be placed in a static location, such as in entrance of a building, of a room, or the like. Additionally or alternatively, the marker may be coupled with a person, such as having the person wear the marker in a visible spot. Additionally or alternatively, the marker may be an image printed on a clothing item, a tattoo, or the like. Additionally or alternatively, the marker may be embedded in a neckless, in earrings, or the like. In some exemplary embodiments, the marker may not be visible to a human eye, but may be sensible to sensors of the AR framework. For example, the marker may be captured by a camera, but may be displayed in a light frequency that is not perceived by a human being. As yet another example, the marker may be sensed using IR camera, and invisible to the naked eye. As yet another example, the marker may be concealed, but emit radio signal, such as RFID, that can be sensed by an appropriate sensor.

In response to identifying an image comprising a marker, or otherwise identifying a marker, the AR framework may be configured to alter its functionality. The functionality may be altered based on the information conveyed by the marker.

In some exemplary embodiments, altering the AR framework functionality may comprise imposing restrictions on at least one skin. The restrictions may comprise a restriction on the execution environment of the skin. For example, the restriction may prevent execution of the skin in a remote device external to the device that the AR framework is being executed on. In some exemplary embodiments, the external device may be an edge device, a cloud server, or the like. Additionally or alternatively, an external device may be a smartphone, a tablet, or the like. As a result, the skin may not be executed on a non-trusted execution environment. In some exemplary embodiments, such marker may ensure information obtained by the AR framework is not exposed to third parties, and is processed on trusted execution environments only.

Additionally or alternatively, the restriction may comprise requiring executing the at least one skin in a predetermined edge device that is external to the AR framework. As an example, a kindergarten manager may want to allow children to play, learn, or the like, with AR glasses. However, due to privacy limitations, it may be desired to prevent the AR frameworks used by the kids to send information to a remote device. Additionally or alternatively, in order to ensure that data redaction is performed when a military base is being recorded, it may be desired to force the AR framework to initially execute a skin that is issued by the military and which ensures all confidential information captured is redacted and is not presented to the user. As yet another example, a school may require execution of a redacting skin to redact any sexually explicit content from the eyes of the children who use AR devices. Additionally or alternatively, the skin may prevent analysis of some objects, may prevent storing of confidential information, or the like. Additionally or alternatively, the restriction may require that the skin is executed on the edge device of the military base. In accordance with the disclosed subject matter, a marker may be placed on the relevant premises, such as in the kindergarten or in the military base, conveying the restriction information to the AR framework. In some exemplary embodiments, the marker may comprise information regarding the edge device on which an AR framework should execute the skin. The information may be an IP address, a server name, or the like. The information may be displayed in letters and numbers, in a Quick Response (QR) code, or the like. Additionally or alternatively, the marker may be associated with an identifier that can be retrieved, and the information conveyed by the marker may be obtained from a server, such as a server accessible through the Internet, which retains a mapping that indicates, for each identifier the relevant restriction associated therewith.

Additionally or alternatively, the restriction may comprise preventing the execution of the at least one skin for a predetermined time. As an example, a user may hold a private meeting. It may be desired to set restrictions during the private meeting. As another example, a person may be giving a lecture to children. In order to keep the privacy of the children, it may be desired to set a restriction on at least one skin, for the duration of the lecture.

Additionally or alternatively, the restriction may comprise preventing at least one skin from applying functionality of facial recognition. Facial recognition may introduce privacy issues. People may not want to be constantly identified. As an example, a restaurant may place a marker in the entrance, signaling AR glasses not to execute at least one skins that is utilizing a facial recognition algorithm. As yet another example, a person who wishes to remain anonymous may wear a marker that prevents AR frameworks from identifying him. As yet another example, the person may wear a marker that requires that the AR framework would execute a skin, concealing his identity, such as by removing facial features and other identifying imagery of the person. In some cases, the skin may provide such functionality with respect to the augmented display of the user. Additionally or alternatively, the functionality may be applied with respect to stored images captured by the AR device, so as to allow the user to interact with the person on the one hand, and on the other hand, to prevent the person's image from being stored for future use without his consent.

Additionally or alternatively, altering the functionality of the AR framework may comprise preventing the AR framework from transmitting a frame or a portion thereof. In some exemplary embodiments, an AR framework may be operationally coupled with a transmitter. The transmitter may be a cellular modem, a WiFi chip, a Bluetooth™ chip, an NFC chip, or the like. As an example, a football match provider may have sold the broadcasting rights. A game provider may place a marker in the entrance of the stadium, preventing from AR frameworks to broadcast a portion of the match. In some exemplary embodiments, the images of the audience and in the crowd may still be transmitted but any portion of the field and the match itself may be excluded from being transmitted. Additionally or alternatively, no frame may be transmitted at the time of the game.

Additionally or alternatively, the marker may be associated with a marked object. In some exemplary embodiments, altering the functionality may comprise not processing or not retaining an image of the marked object. As an example, a person may be wearing a badge that constitutes a marker. The AR framework may be configured to prevent a skin may from processing the image of the person, an object associated with the person, or the like. Additionally or alternatively, the AR framework may be configured to prevent any skin from saving frames comprised by the marked object, or may be configured to redact the person from stored images.

In some exemplary embodiments, the marker may be identified by the AR framework before any of the skins are executed. In some exemplary embodiments, the skins may not be able to modify the restrictions or other altered functionality defined by the marker, thereby ensuring compliance with the instructions conveyed by the marker. Additionally or alternatively, an authority skin may be executed last to ensure that the overlay display generated by the skins is indeed in compliance with the altered functionality defined by the marker. For example, the authority skin may be registered on unmodifiable objects and ensure that the overlay display does not modify their appearance. As another example, the authority skin may be registered on objects to be redacted and ensure that no such object remains in the AR display, such as ensuring that it is redacted by the overlay display. In some exemplary embodiments, a skin, such as the authority skin, may also analyze the frame itself regardless of the objects recognized by the AR framework. This may be useful to ensure that another skin did not delete metadata about an existing object without deleting the object itself.

In some cases, a skin may be authorized to remove the restrictions that were applied due to the marker, so as to allow the authorized skin or succeeding skins to perform restricted operations, or otherwise avoid performing the altered functionality. For example, an authority skin may be executed and for users who are authorized, such as officers, may remove all restrictions applied due to the marker. The authority skin may be executed before executing other skins, thereby ensuring that other skins, which do not have permission to override marker instructions, indeed operate as they should on all objects, regardless of the marker.

Another technical solution is to provide an indication that the AR framework has identified the marker and that it is imposing the restriction. In some exemplary embodiments, a provider of a marker may wish to receive indication that AR framework is imposing the restriction. The indication may be provided using a Light-Emitting Diode (LED), a screen, an acknowledgment packet that is sent to a server, or the like. In some exemplary embodiments, an external device may be configured to receive the indication so as to ensure compliance. In some exemplary embodiments, the indication may be received using computer vision techniques. Additionally or alternatively, the marker may indicate an address of a server to which the indication is to be provided. In some exemplary embodiments, a marker may be placed in the entrance of a room, an office, at the entrance of a building, a compound, a site camp, or the like. Entrance to the premises may be prevented until it is verified that the restriction is applied. As an example, a barrier may prevent entrance to the premises, and upon receiving the indication that the restriction is applied the barrier may be removed to grant entry.

Yet another technical solution is to use a second marker in order to lift the restriction imposed by the first marker. As an example, a building may have an entrance and an exit. A marker in the entrance of the building may signal an AR framework not to execute skins that apply facial recognition. A second marker may be located at the exit of the building, indicating that the AR framework may lift the restriction and continue executing skins that restricted skins once again.

One technical effect of utilizing the disclosed subject matter is to allow people to control their privacy over AR frameworks that are being used by others. The marker may convey privacy setting of the person that is wearing the marker, which may be respected by the AR framework with respect to the marker, to associated object thereto, to a predetermined location, or the like. The privacy setting may be a restriction that the person may wish to impose on AR frameworks that capture his likeness. The restriction may be a restriction preventing from the AR framework to process the image of the person, preventing the AR framework from storing the image of the person, preventing from the AR framework from utilizing facial recognition to identify the person, preventing the AR framework from modifying his likeness, such as removing a clothing item, adding makeup to his face, modifying his hairstyle, or the like.

Additionally or alternatively, proprietors may utilize the disclosed subject matter to control functionality of AR frameworks of third parties that are being utilized on their premises. In some exemplary embodiments, markers may be utilized to impose restriction in specific locations. Non-limiting examples of such restrictions may include restrictions preventing data leakage, such as preventing the AR devices from sending captured images, redacting captured information before transmitting the data to external devices, requiring processing be performed in a trusted execution environment controlled by the proprietor, or the like; enforcing execution of desired functionality, such as monitoring visitors in the premises by executing a skin that reports their location, forcing reports of suspicious or illegal activity captured by the AR framework while in the premises, or the like.

Additionally or alternatively, entities controlling an area may utilize the disclosed subject matter to impose restrictions on AR frameworks that are being used in the area. The area may be a military base, a hospital, a playground, a court of law, or the like. An entity controlling the area may place an image of a marker in the entrance to the area, signaling entering AR frameworks the required privacy policy in that area. As an example, a hospital manager may wish to prevent from people entering the compound to use AR frameworks for identifying patients. In some exemplary embodiments, the AR framework may be embedded in eyeglasses, sunglasses, or the like. It may not be practical to band people from wearing AR glasses in a compound, however, it may be desired to restrict the functionality of the AR, which may infringe bystanders' privacy.

Another technical effect of utilizing the disclosed subject matter is to grant entry of people using AR devices only to those using AR devices that obey a desired policy. A barrier, such as a gate or a door, may be configured to open automatically upon obtaining a signal from the AR framework that acknowledges that the restriction is being imposed. In some cases, the restriction may be imposed for a predetermined timeframe or until another marker is identified and processed.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing an environment, in accordance with some exemplary embodiments of the disclosed subject matter. Environment 100 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Patent Application Publication 2016/0,240,005, entitled "Subject selected augmented reality skin", dated Aug. 18, 2016, all of which are incorporated herein by reference in their entirety without giving rise to disavowment.

Environment 100 may comprise a Person 110. Person 110 may be wearing AR Glasses 120. AR Glasses 120 may comprise a frame sensor such as Camera 124 for capturing images that are processed by the AR framework. Lenses of the AR Glasses 120 may be configured to display an overlay display that is seamlessly interwoven with the physical world as perceived by Person 110, such as by adding layers over perceived objects, modifying perceived objects, removing perceived objects, or the like.

In some exemplary embodiments, AR Glasses 120 may comprise Signaling Module 122. Signaling Module 122 may be a LED providing a visual signal, a speaker, a wireless transmitter providing a signal using radio frequency, or the like. Signaling Module 122 may be configured to provide a signal indicative of the restriction being imposed by the AR framework. In some exemplary embodiments, other persons may perceive the signal and be aware that a restriction is imposed by the AR framework. Additionally or alternatively, a computerized device may be configured to perceive the signal indicating that the AR framework is imposing a restriction. In some exemplary embodiments, Signaling Module 122 may provide a signal that cannot be perceived by a person, such as in an audio frequency that is not within a human hearing range, a visual indication in an infrared light invisible to the human eye, or the like.

Environment 100 may comprise a Car 180. Car 180 may be driven by a Person 170. Car 180 may comprise a Frame Sensor 150. Frame Sensor 150 may be associated with the field view of Person 170.

Car 180 may comprise an AR Display 160 embedded within the windshield of Car 180. An AR framework may display the overlay display using AR Display 160, so as to provide an augmented display of the physical world. In some exemplary embodiments, frames from Frame Sensor 150 may be analyzed by the AR framework, which may generate overlay display to be presented using AR Display 160.

In some exemplary embodiments, Skins 125 may be utilized to provide the augmented display. Skins 125 may comprise a plurality of skins, Skin 125a, Skin 125b, . . . , Skin 125n, or the like, each of which configured to analyze the frame or portion thereof and provide an overlay display thereon. The overlay displays may be combined, on top of each other, to provide the final overlay display that is presented to the user (e.g, Person 110, Person 170) to provide augmented reality experience. In some exemplary embodiments, the AR framework may be configured to analyze the frame, identify objects therein, invoke the Skins 125 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 100 may comprise an Edge 130. Edge 130 may comprise a processor, a receiver, a transmitter, a memory, or the like. Edge 130 may be a computer, a smartphone, or the like. Similarly, an Edge 130' may be an edge computer that is installed within Car 180. Additionally or alternatively, Edge 130' may be a smartphone of Person 170, the infotainment system of Car 180, or the like. Edges 130, 130' may be utilized by the AR framework to execute one or more skins. In some exemplary embodiments, Edges 130, 130' may constitute an execution environment for executing skins. Edges 130, 130' may communicate with the AR framework, or components via a computerized network.

Environment 100 may comprise Server 140. Server 140 be a remote cloud server. In some exemplary embodiments, Server 140 may be configured to obtain information from the AR framework, execute a skin, provide the output of the skins to the AR framework, or the like. Additionally or alternatively, Server 140 may be utilized by the AR framework to execute one or more skins. In some exemplary embodiments, Server 140 may constitute an execution environment for executing skins.

Environment 100 may comprise Frame Sensor 190 that is external to AR Glasses 120 and to Car 180. Frame Sensor 190 may be associated with the field view of Person 170 or Person 120. Frame Sensor 190 may transmit frames to Edge 130, 130' or to Server 140. An AR framework may utilize frames sent from Frame Sensor 190, such as to augment the display of the user, to identify objects to be analyzed, or the like.

In some exemplary embodiments, the AR device, such as AR Glasses 120, AR Display 160, or the like, may be connected to an edge computer, such as Edges 130, 130', and to cloud server, e.g., Server 140. The edge computer, however, may be closer to the AR device than the cloud server, such as having a reduced latency thereto, requiring reducing power consumption to reach it, or the like. For example, the edge computer may be directly connected, such as using a Bluetooth connection, using WiFi connection, using local cellular connection, or the like. Additionally or alternatively, the edge computer may be connected to a same Local Area Network (LAN) as the AR device, may be physically connected thereto using a cabled connection, or the like. In some exemplary embodiments, communication to Server 140 may be provided through a Wide Area Network (WAN), through the Internet, or the like. For example, Server 140 may be a cloud computing platform that is used by various AR devices that are located remotely therefrom and from one another.

In some exemplary embodiments, different execution environments may have different resources. For example, Server 140 may have more computational resources, memory resources, or the like than Edge 130. Additionally or alternatively, each execution environment may have different power resources. The AR device, such as AR Glasses 120 may have limited power supply. Additionally or alternatively, Edge 130, which may be implemented by a mobile device, may also have limited power supply. Additionally or alternatively, different execution platforms may retain, locally, or have connectivity to, different data storages. For example, a database used for identifying a person using facial recognition may be retained on Server 140. AR Glasses 120 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 130 or on Server 140. As an example Skin 125*a* may be executed on AR Glasses 120, Skin 125*b* may be executed on Edge 130 and Skin 125*n* may be executed on Server 140. In some exemplary embodiments, each skin may receive, as input, the output of the previous skin, in accordance with an order of execution, so as to add a layer on top thereof. As an example, Skin 125*a* may add an image of a cat, and Skin 125*b* may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 2:
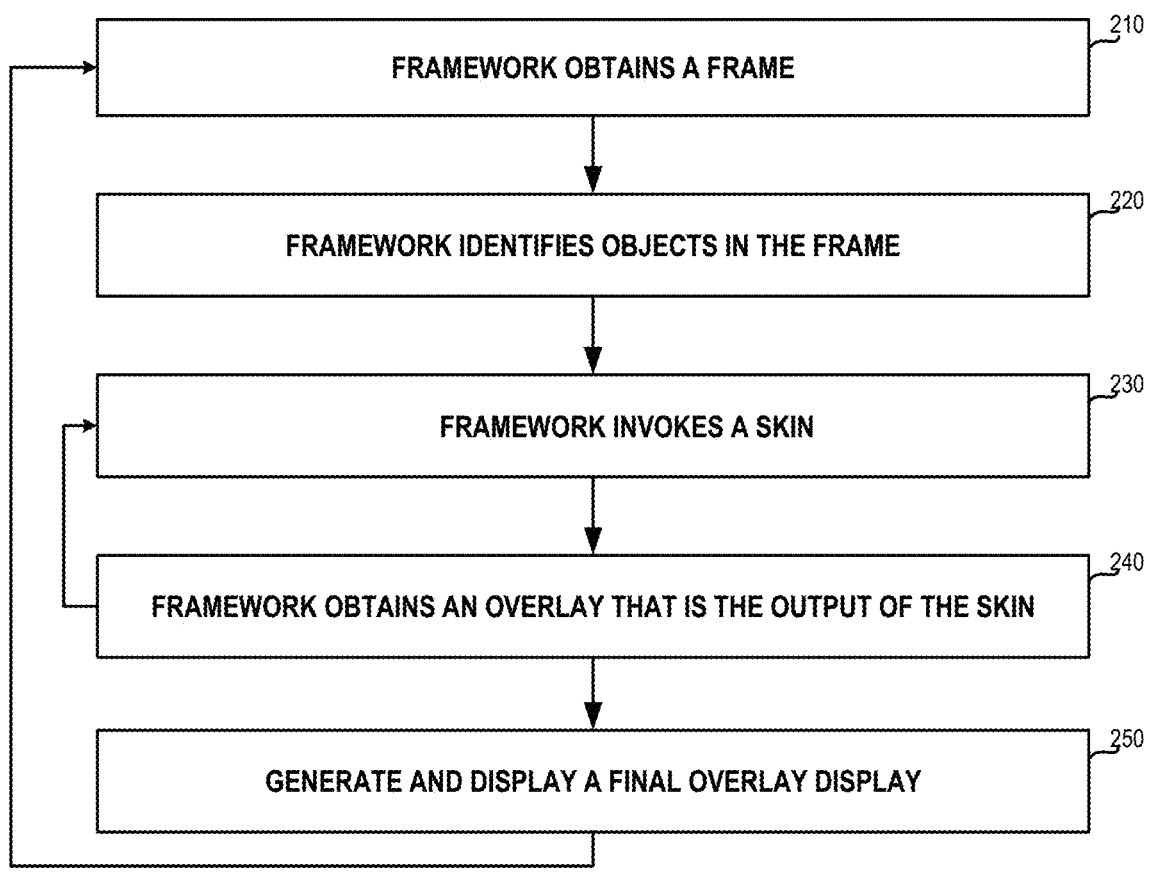
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., 124 of FIG. 1). Additionally or alternatively, the frame may be obtained from a computerized environment such as an edge device, a remote cloud server, or the like. Additionally or alternatively, the frame may be obtained from an external frame sensor, such as 190 of FIG. 1, that may be utilized to capture information that may be obscured and blocked from the view of the user. In some exemplary embodiments, images may be obtained from a plurality of sources and may be integrated together to create the frame.

On Step 220, the framework identifies objects that are in the frame. The framework may be configured to identify objects using algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 230, the framework may invoke a skin. The framework may hold a list of available skins and objects that the skins are registered on. The framework may be configured to iterate over the list of skins and in response to identifying that a skin is registered on a type of an object that the frame comprises, the framework may invoke the skin. In some exemplary embodiments, the framework may invoke the skin with the identified object and provide only the object for processing instead of the entire frame. In some exemplary embodiments, the list of skins may be provided in an order of processing, which may affect the end outcome. In some exemplary embodiments, if several skins are registered over the same object type, the same object may be processed by the several skins, in accordance with their relative order. In some exemplary embodiments, invoking the skin may comprise providing the skin with a frame. Additionally or alternatively, invoking the skin may comprise providing the skin with a metadata record that is associated with the frame.

In some exemplary embodiments, the skin may be invoked once and receive the frames and the metadata as a stream, yielding a performance improvement compared to invoking the skin per each frame that is captured. The skin may process the frame, the stream of frames, or the like. In some exemplary embodiments, per each frame, the skin may check if the metadata comprises new privacy restriction and change its operation based thereon. As an example, a woman may be walking on a beach, with her AR glasses. The AR glasses may execute a skin that is configured to recognize face and pull information regarding the faces from a social network database. The woman may enter a nudist beach. At the entrance to the nudist beach, there may be a marker signaling the AR glasses not to perform facial recognition. The AR framework may embed that restriction in a metadata. The skin may obtain the metadata and pause its operation until the restriction is lifted. In some exemplary embodiments, the skin may unregister from the objects in the AR framework, and register with the AR framework for a notification when the altered functionality is lifted. Upon receiving such notification, the skin may re-register on the objects of interest. As a result, performance improvement is achieved as the skin is never invoked when it is unable to perform its intended operation due to the marker-related instructions. Additionally or alternatively, the AR framework may manage the unregistration and registration of pertinent skins, instead of the skin itself unregistering and re-registering itself.

On Step 240, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally, or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as $dis(x, y) = o(x, y) \cdot m(x, y) + f(x, y) \cdot (1 - m(x, y))$. The overlay display (od), however, may be computed as $od(x, y) = o(x, y) \cdot m(x, y)$. Bitwise operations may be performed on the bitmasks, such as $dis = (o \text{ AND } m) \text{ XOR } (f \text{ AND } \neg m)$, and $od = o \text{ AND } m$. In some exemplary embodiments, the mask may be either 0 (do not use the overlay bit) or 1 (use the overlay bit). Additionally, or alternatively, values in between 0 and 1 may be used to provide for opaqueness and transparency properties.

In some exemplary embodiments, the overlay may be an image in the size of the frame. As the AR framework may combine the overlay with the frame, the overlay may comprise pixels that are the output of the skin and transparent pixels otherwise. Additionally or alternatively, the overlay may comprise an image that may be the output of the skin and its relative position in the frame. In some exemplary embodiments, the overlay may comprise information regarding the importance the position of the overlay in the frame. As an example, an informative skin that adds labels to object may be agnostic regarding the position of the label. Additionally or alternatively, a skin that adds lipstick may configured to set its location requirement to "high" to "1", or the like.

In some exemplary embodiments, if the view is shared or stored, the overlay display may be overlayed over the frame to generate the AR frame, which represents the view that is perceived by the user using the AR device.

In some exemplary embodiments, Steps 230-240 may be performed iteratively, while invoking different skins, until all skins that are registered on available objects are invoked. In some exemplary embodiments, an overlay is obtained from one skin, incorporated into the frame and potentially provided to the next skin that processes the affected area. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing.

On Step 250, the final overlay display that is generated, based on the combined overlays of the invoked skins, may be displayed. It is noted, that the overlay is seamlessly interwoven with the physical world, which is represented by the original frame of Step 210. As a result, the overlay display is overlaid over the physical world, without combing the frame itself.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 210-250 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be invoked, added to the list of active skins and be invoked as long as the user is in the supermarket. When the user leaves the supermarket, the skin may be deactivated. In some exemplary embodiments, activation or deactivation may be defined to occur when a marker is identified, as explained hereinbelow. Additionally or alternatively, upon identifying a marker, a suggestion to activate a skin may be presented to the user and the user may confirm or reject the suggestion. In some cases, the user may set his personal preferences, such as based on identifying markers, based on his location, based on a context, based on a time of day, based on a social environment in which he his located, or the like.

Figure 3:
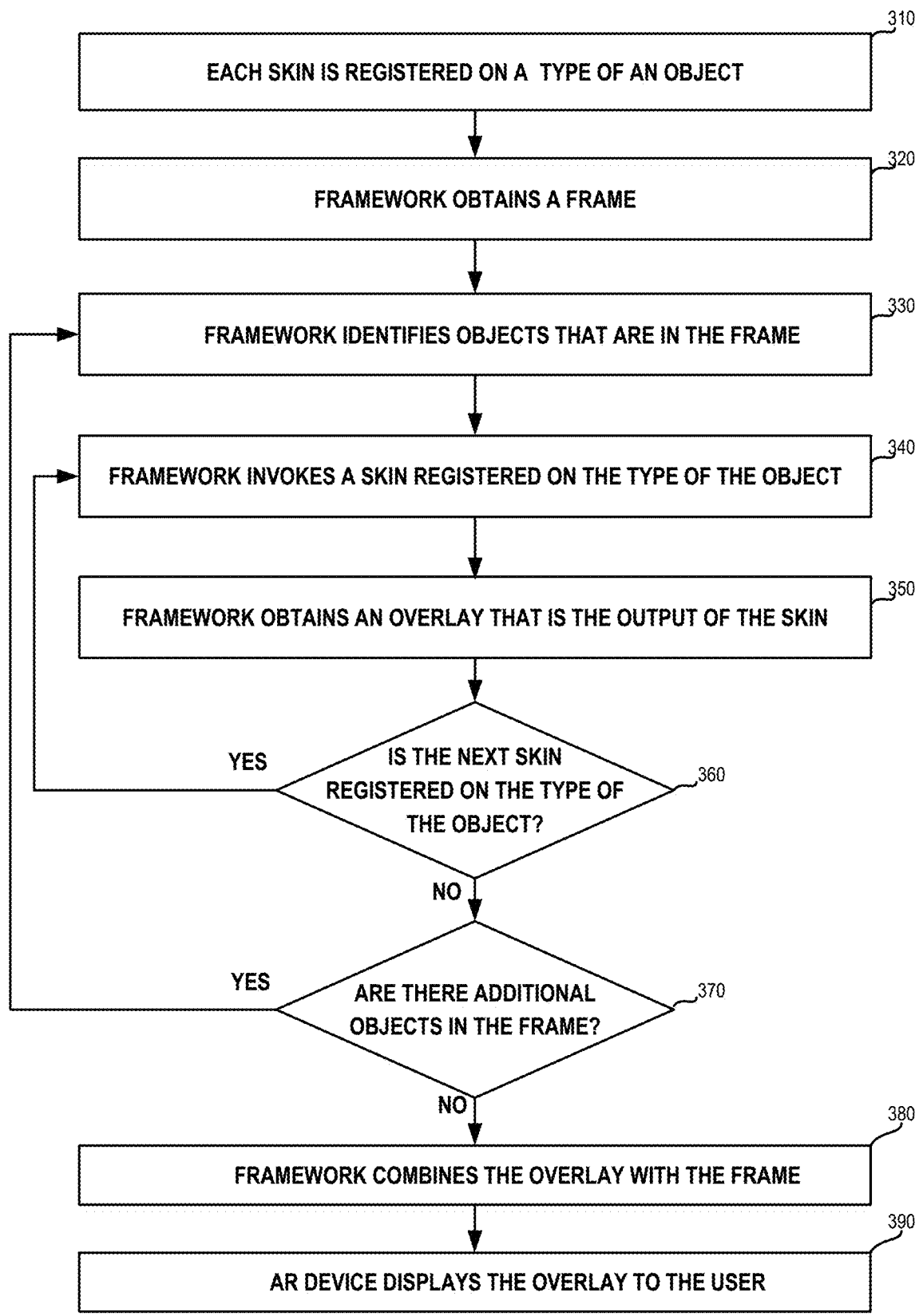
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, each skin is registered on a type of an object. In some exemplary embodiments, each skin may register with the AR framework to receive notification and handle specific types of objects. An object appearing in the frame may be identified and classified to a type. The AR framework may support a variety of objects types, such as but not limited to a person, an animal, a house, a road, a plant, a tree, a face, an eye, or the like. In some exemplary embodiments, an object may be classified with a plurality of object types, such as objects that are an abstraction or instantiation of one another (e.g, a police officer may be an instantiation of the more abstract type, person), may be a different view of the same object (e.g., a person may be both an adult, a female and a Caucasian), or the like. In some exemplary embodiments, an object may comprise other objects. As an example, an object of type person may comprise objects of type face, eyes, arms, cloths, or the like.

On Step 320, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge the frames to a single frame prior to processing the frame. As an example, the AR framework may not have access to a frame as viewed from the point of view of the user. Using a plurality of cameras, several different images may be transformed and merged together to provide an estimated frame of the view of the user. The image of the room or of the person may be taken from several image sensors. Frames from different image sensors may be merged to a single frame.

On Step 330, the AR framework identifies objects that appear in the frame. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like.

In some exemplary embodiments, the AR framework may classify the objects by types and may build a list comprising the types of the objects that comprises the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some cases, skin that are executed by the AR framework may access the metadata record, utilize its content, and potentially update its.

In some exemplary embodiments, an object may not have existed in the frame as captured by the frame sensor. A skin may process the frame or portion thereof, and add an object to the metadata record to indicate the existence of the new record, to ensure it is processed correctly. As an example, a skin may add a label to be presented near an existing object, a skin may add an object of a cat, a navigation skin may add a graphical representation of a route on top of the road, or the like. As another example the AR framework may add images of family members of a person that is shown in a frame, a garden near a house, or the like.

On Step 340, the AR framework invokes a skin is registered on the type of the object. As each skin may have registered on types of objects of interest to it (e.g., Step 310), the AR framework may invoke only skins that have objects of interest in the frame and avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 120) itself, an edge computer (e.g., Edge 130, 130' of FIG. 1), a server (e.g. Server 140 of FIG. 1). The skins may be executed on different devise. In some cases, each skin may be executed on an AR device (e.g., AR Glasses 120 of FIG. 1), on an edge computer (e.g., Edges 130,130' of FIG. 1), on a server (e.g., Server 140 of FIG. 1), or the like. The AR framework may invoke the skin on the relevant computing environment to process the objects of interest. As an example, the skin may begin execution upon a command of the AR framework. As another example, the skin may be executed by a daemon process that pre-exists and is begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that consists of the object of interest. If several objects appear, the AR framework may invoke the skin a plurality of times, each of which with a different sub frame. Additionally, or alternatively, the AR framework may provide the skin with the metadata of the object, for accessing and potentially for updating. For example, in the skin performs facial recognition, the skin may update the metadata properties of the object to indicate the identified persona of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

The skin may change the object, add another object thereto, or the like. In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replace the object by another object, or the like.

In some exemplary embodiments, the skin may provide an output. The output may comprise an overlay to be displayed over the frame or patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally or alternatively, the skin output may comprise the metadata record. In some cases, the metadata record may be updated by the skin to add information gathered by the skin to existing objects, to add new objects (e.g., the balloon added in the example above), or the like. Additionally or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 380), the AR framework may determine the location, size, and other visual properties of the labels, and draw them, to add an additional overlay layer, referred to as a label overlay.

In some exemplary embodiments, the metadata record outputted by the skin may be the updated metadata record. Additionally or alternatively, the metadata record may comprise the added information only, so as to allow the AR framework to modify the metadata record accordingly at its discretion.

On Step 350, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 360, it may be determined if there is another skin that is registered on the same type of object. If so, Steps 340 and 350 may be performed again with the respect to the next skin, which may process the same objects. Otherwise, Step 370 may be performed.

On Step 370, in case there is another object in the frame that was not yet processed, Steps 330-360 may be repeated with respect to the additional object. As a result, the AR framework may iterate over each object that is in the frame and invoke skins thereon. Otherwise, Step 380 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type. In some exemplary embodiments, parallel execution may be performed on different execution platforms. Additionally, or alternatively, parallel execution may be useful to reduce latency caused by processing time. In some cases, the final output may be provided within a target time, so as to enable an output display stream at a desired rate, such as for example, a rate of at least about (e.g., ±10%) 20 FPS, 60 FPS, 90 FPS, or the like.

On Step 380, the AR framework may combine overlays from different skins to provide an output overlay. The output overlay may be displayed to the user, providing an augmented reality experience with augmentation over the frame viewed by the user. Additionally, or alternatively, a label overlay may be generated by the AR framework and combined with the skin-generated overlays.

In some exemplary embodiments, the AR framework may add the overlay of each skin to as soon as the overlay is available. Additionally or alternatively, it may be useful to postpone adding an overlay order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, may be updated by the AR framework in response to identification of a marker, or the like. In some cases, the AR framework may enforce the restrictions defined by the privacy settings. For example, if the privacy settings allow retaining and sharing of the frame, that information may be retained and shared. Additionally, or alternatively, the AR framework may combine the frame and display overlay for generating the AR view to be shared and retained for future use. If the privacy settings do not allow sharing of the frame, the frame itself may not be shared with others. Additionally, or alternatively, if the privacy settings prevent the sharing or storage of specific objects in the frame, the AR framework may redact portions of the frame, of the display overlay, combination thereof, or the like, based on the privacy settings.

On Step 390, the overlay display is displayed using the AR device. As a result, the overlay display is overlaid over the physical world, without combing the frame itself. In some exemplary embodiments, the overlay display is displayed by the AR glasses, providing personalized AR view of the world to the user. Additionally, or alternatively, the AR device may be the windshield of a vehicle, providing a passenger of the vehicle with an augmented view of the surroundings of the vehicle.

Figure 4:
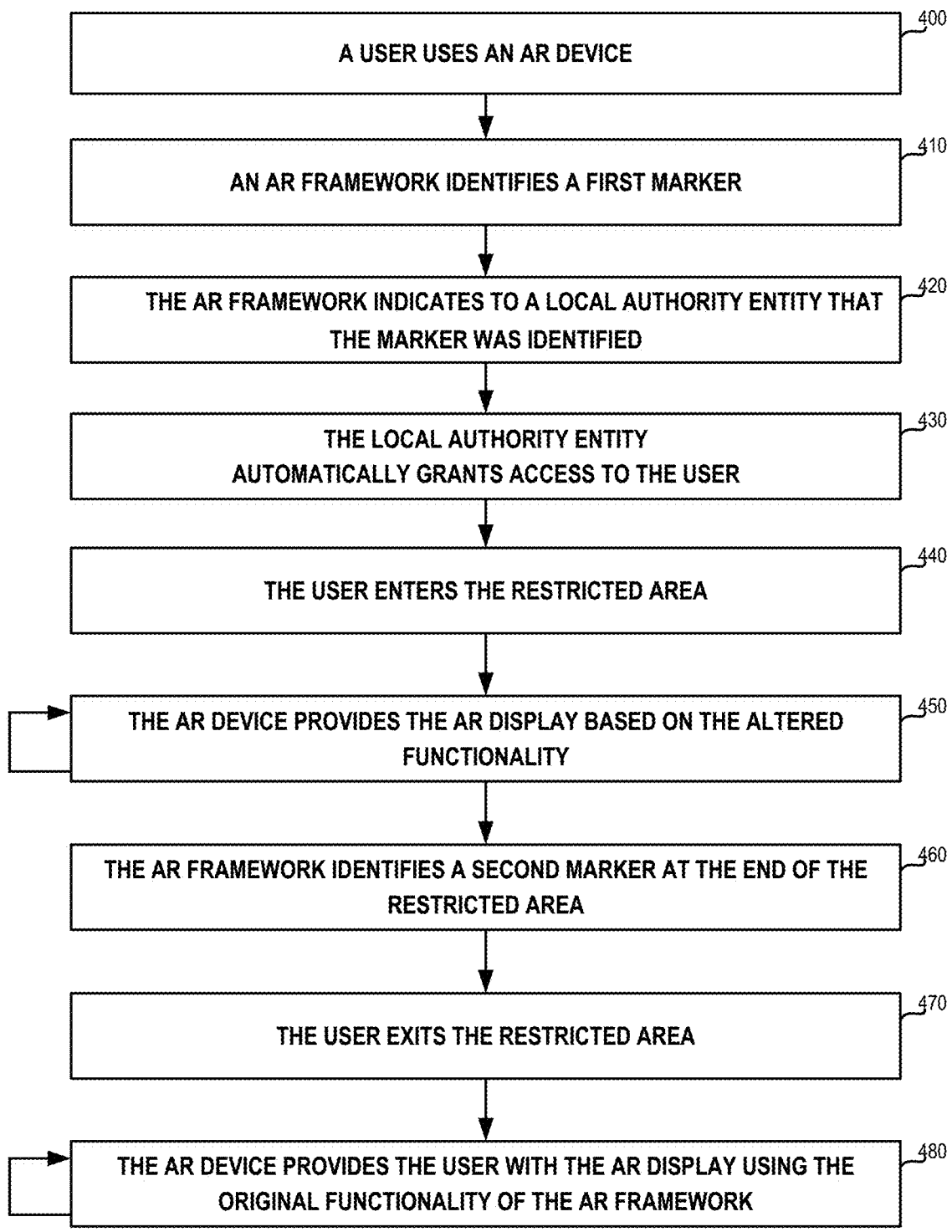
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 400, a user uses an AR device. The AR device operatively coupled to an AR framework for providing an AR display to the user via the AR device.

On Step 410, an AR framework identifies a first marker. As a result, the AR framework alters its functionality based on the instructions conveyed by the first marker.

On Step 420, the AR framework indicates to a local authority entity that the marker was identified and altered functionality was implemented.

On Step 430, the local authority entity automatically grants access to the user using the AR device of the AR framework to a restricted area. In some exemplary embodiments, the access may be granted by lifting a barrier preventing physical access to the restricted area. For example, a gate, a door, or the like may be automatically opened.

On Step 440, the user enters the restricted area.

On Step 450, the AR device provides the AR display based on the altered functionality. The AR display is continually provided to the user while the user is located within the restricted area, and as long as the restrictions conveyed by the first marker are applied On Step 460, the AR framework identifies a second marker at the end of the restricted area. In some cases, the user may be near the end of the restricted area, and the second marker may be located so as to be captured after leaving the restricted area or immediately prior to that. As a result, the AR framework undoes the altered functionality performed on Step 810. Additionally or alternatively, the second marker may indicate that the altered functionality is to be undone when reaching a predetermined location, such as after exiting the restricted area. Additionally or alternatively, instead of identifying a second marker, the first marker may define a timeframe during which the altered functionality is active and upon reaching the end of the timeframe, the original is functionality may be restored. Additionally or alternatively, the first marker may define the predetermined location, that when reached, the original functionality is restored. In some exemplary embodiments, the predetermined location may be identified using a beacon, an RF transmitter, or the like.

On Step 470, the user exits the restricted area.

On Step 480, the AR device provides the user with the AR display using the original functionality of the AR framework.

Figure 5:
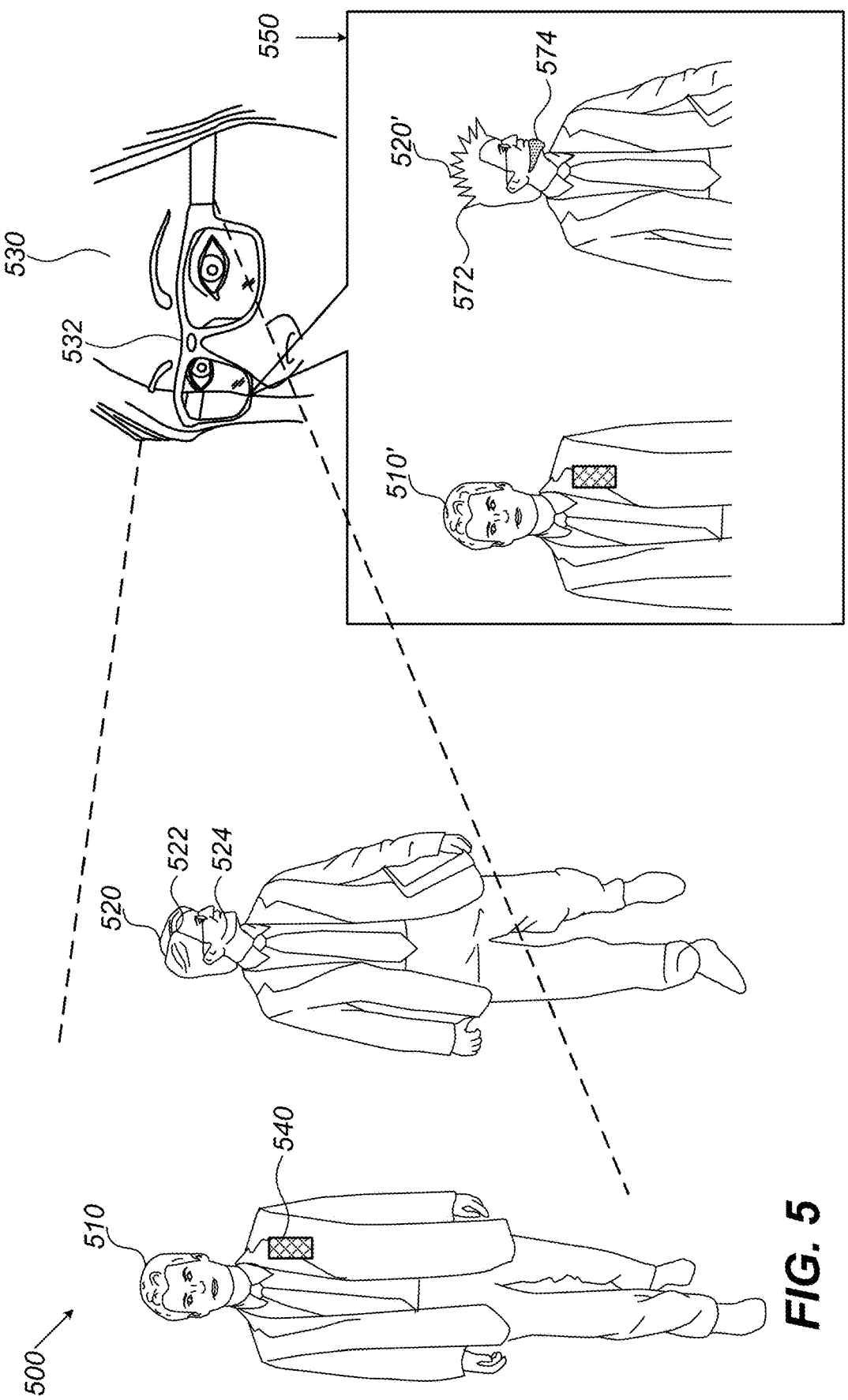
FIG. 5 shows a schematic illustration of an environment in which the disclosed subject matter may be utilized, in accordance with some exemplary embodiments of the disclosed subject matter.

Referring now to FIG. 5 showing a schematic illustration of an environment in which the disclosed subject matter may be utilized, in accordance with some exemplary embodiments of the disclosed subject matter.

FIG. 5 illustrates Environment 500. In Environment 500, there are two people, Person 510 and Person 520. Person 510 is wearing a Marker 540. It is noted that Marker 540 is visible on Person 510 or otherwise can be perceived by the sensors of an AR framework (not shown). The AR framework may be configured to identify that Person 510 is wearing Marker 540. In response to identifying Marker 540, the AR framework may alter its functionality based on instruction conveyed by Marker 540. For example, Marker 540 may indicate restrictions on a skin that is configured to augment the image of Person 510. Additionally, or alternatively, Marker 540 may indicate other restrictions, such as but not limited to preventing performing facial recognition, preventing storing of the image of Person 510, preventing from sharing the image of Person 510 or limiting subjects with which the image is shared (e.g., only to social network friends of Person 510, only to his friends and friends of friends, to a specific group of people, to a group of people and excluding a second group, or the like). In some exemplary embodiments, altering the functionality of the AR framework may comprise processing the image of an object that comprises a marker in order to enhance the object privacy. As an example, AR framework may delete the face of Person 510 that is wearing Marker 540, may not execute a skin that performs facial recognition thereon, requiring that the object be processed by a specific skin, setting a different order between skins execution, or the like.

In some exemplary embodiments, AR framework may be configured to perform object tracking with respect to Person 510. As Marker 540 is identified to be associated with the object of Person 510, the privacy preferences that are enforced with respect to Person 510 may be continued to enforce regarding Person 510 in the next frames as well. In some exemplary embodiments, AR framework may retain the privacy settings and use them for the next frames. In some cases, the AR framework may retain the information that Person 510 is wearing a Marker 540. In case that Person 510 turns around and Marker 540 is not visible in the next frames, the privacy preferences as defined by Marker 540 may continue to be enforced regardless of the Marker 540 no longer being visible.

User 530 is wearing AR Glasses 532 and may be watching the first person and the second person. AR Glasses 532 may be operatively coupled with AR framework. In the illustrated example, the AR framework is defined to execute two skins: a skin that modifies a person's hair, and a skin that adds a beard to people's face. AR Glasses 532 may be utilized to provide User 530 with an AR View 550.

AR View 550 may be the augmented view as seen by User 530 through AR Glasses 532. As User 530 is looking at Persons 510, 520, and as the two skins are executed, augmented features may be added to Persons 510, 520. As can be appreciated, AR Person 520' appears with augmented features due to the execution of the two skins. Namely, Hair 522 is modified to Augmented Hair 572, while Cheek 524 is covered with Augmented Beard 574. As Person 510 is wearing a Marker 540, the functionality of the AR framework with respect to Person 510 may be altered. AR Person 510' may appear identical to Person 510 real life appearance. As a result, privacy settings and preferences defined by Person 510 may be enforced on an AR framework that is not controlled by Person 510 and to which he does not have any access. In some exemplary embodiments, the relationship between Person 510 and the AR framework is merely the fact that the AR framework captures and potentially processes his image, as a subject of potential AR manipulation.

In some exemplary embodiments, AR View 550 may comprise Marker 540 without a change. Marker 540 may be a final object. A final object may be an object that the AR framework prevents skins from removing, processing, or the like. As a result, even if Marker 540 is delivered to other skins, they may be prevented from obscuring it, so as to allow User 530 to understand that Person 510 was processed differently due to his preferences, as exhibited by Marker 540.

Additionally, or alternatively, Marker 540 may be invisible to the naked eye. A graphical representation of Marker 540 may be added in AR View 550 to inform the user of the privacy settings applied. Additionally, or alternatively, AR View 550 may provide a different visual representation of Marker 540 or of privacy settings conveyed thereby, while removing the appearance of Marker 540. As an example, people for which no skin is executed may be outlined using a red line. People for which a specific skin is not executed may be outlined using a yellow line. People for which privacy settings prevent sharing their image may be outlined using a dashed line. Using different visual representations, User 530 may be visually informed of the different privacy settings enforced by different markers on different objects.

Additionally, or alternatively, AR View 550 may remove the appearance of Marker 540. This may be desired, for example, if User 530 does not want such information indicated to her. Additionally, or alternatively, Marker 540 may indicate whether or not AR View 550 is to include a visual representation of Marker 540.

Figure 6A:
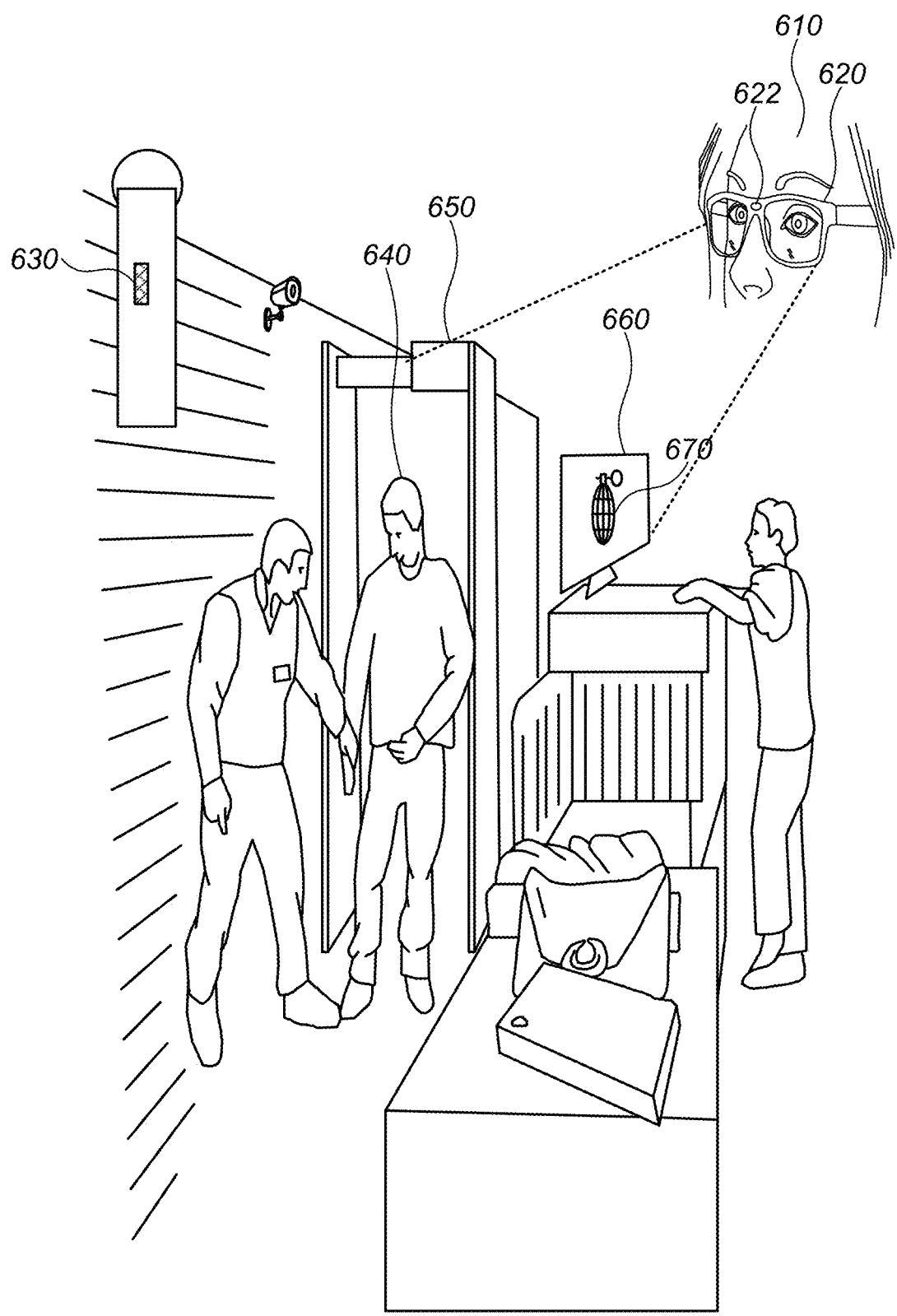
FIGS. 6A-6B show flowchart diagrams of methods, in accordance with some exemplary embodiments of the disclosed subject matter.

Referring now to FIG. 6A showing an environment, in accordance with some exemplary embodiments of the disclosed subject matter.

Figure 6B:
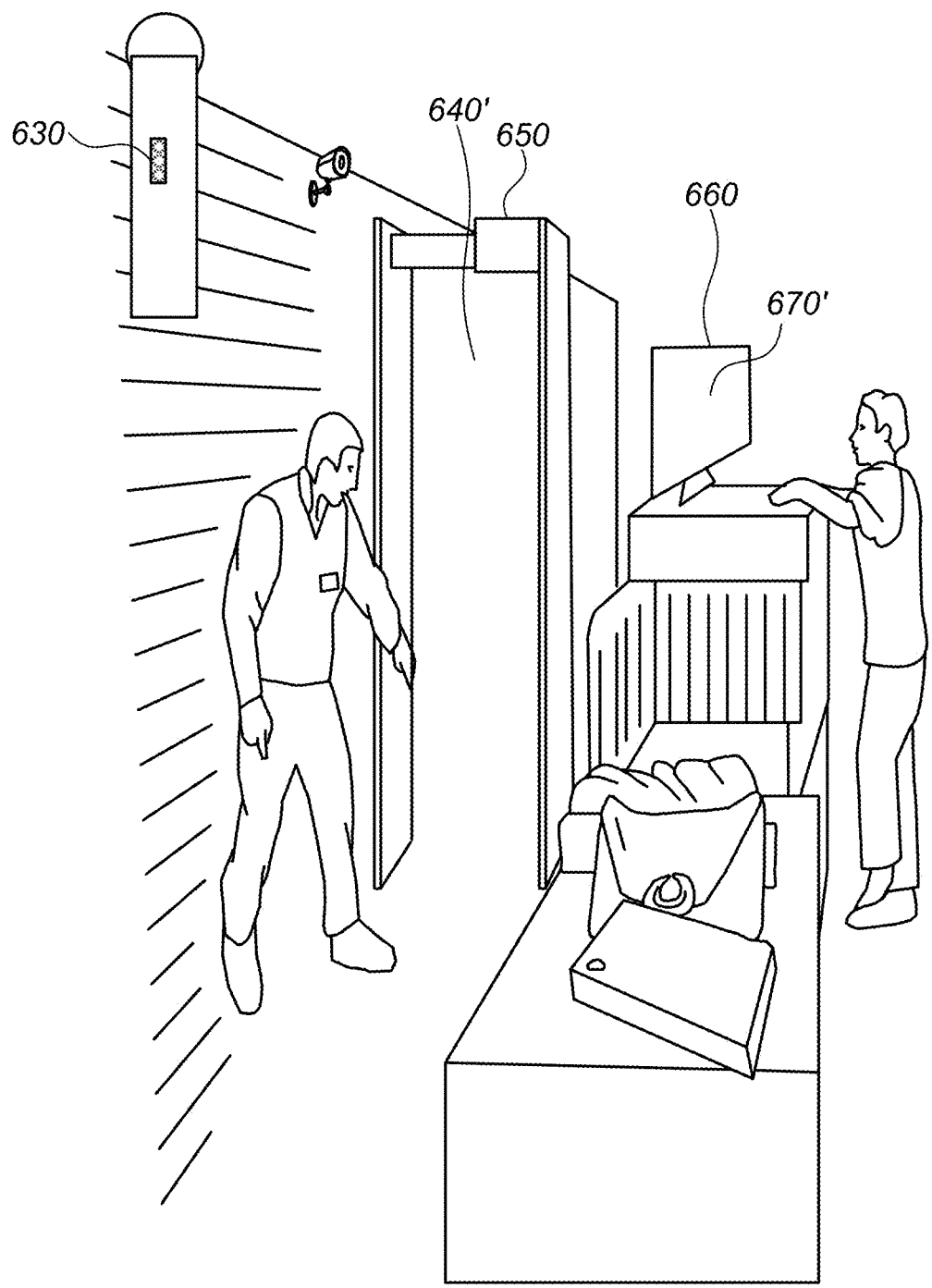

FIG. 6A illustrates a security check zone as may be found in an airport, in an entrance to a secure location, or the like. Marker 630 is on the wall. Marker 630 may signal AR frameworks that obtain frames of the room to alter their functionality. FIG. 6B shows the AR view provided by the AR framework based on the altered functionality. As can be appreciated, the altered functionality may comprise removing objects from the frame so as to not be viewed by User 610, not be transmitted to a remote location, or the like. In FIG. 6A, depicting the actual real physical environment, Person 640 is being scanned in a Full Body Scanner 650. FIG. 6A also includes Screen 660 showing the X-Ray imaging of the luggage and bags that are being screened. In the illustrated example, a Hand-grenade 670 is shown on Screen 660.

In some exemplary embodiments, Marker 630 may be a physical object, an image, a QR code or the like. In some exemplary embodiments, data regarding the restriction that AR frameworks may impose may be embedded in Marker 630. As an example, the data may comprise commands such preventing transmission of frames, of augmented overlays, of combinations thereof, preventing processing on the cloud, requiring processing on a local edge computer controlled by the security authority responsible for the security check zone, preventing from performing facial recognition to Transportation Security Administration (TSA) officers, preventing from performing facial recognition to bystanders, forcing execution of a redacting skin, or the like. Additionally or alternatively, the data may include an IP address conveyed by Marker 630. An AR framework that captures an image of Marker 630 may obtain an altered functionality description by accessing the computer at the IP address. The altered functionality description may be retained on a cloud server, on a local edge computer, or the like.

In some exemplary embodiments, the AR framework may be configured to transmit the image of Marker 630 to a predetermined server, such as a general certification server, a server identified by the marker, or the like.

Additionally or alternatively, AR Glasses 620 may comprise Signaling Module 622. In response to applying restrictions or otherwise altering the functionality based on Marker 630, Signaling Module 622 may transmit signals indicating that the altered functionality is being implemented. The signal may be a visual signal, such as using a LED, a wireless signal, such as using an RF transmission, or the like. In some exemplary embodiments, the signal may encode which altered functionality is being implemented.

In some exemplary embodiments, upon starting to impose restriction and implementing the altered functionality, the AR framework may send to a server that is associated with an IP address conveyed by Marker 630, a message confirming that the AR framework is imposing the restriction. The message may comprise data such as the location of AR Glasses 620, the model of the AR Glasses 620, the restriction policy that the framework is imposing, a combination thereof, or the like. Additionally, or alternatively, the message may comprise an augmented frame, comprising the frame and a display overlay overlaid thereon. The server may analyze the frame and determine whether or not the altered functionality is imposed properly. Additionally or alternatively, the message may comprise an image of Marker 630 as seen through AR glasses 620. The server may validate that the image is indeed of the correct marker, such as by comparing the transmitted image with a stored image of the marker.

In some exemplary embodiments, Marker 630 may be associated with a physical barrier (not shown). The barrier may be configured to open upon determining that the AR framework that User 610 is using implements the altered functionality. For example, the barrier may open upon receiving a message from an AR framework that it has captured the image of Marker 630 and that the AR framework is imposing the required restrictions. Additionally, or alternatively, the barrier may open in response to capturing a signal issued by Signaling Module 622.

In some exemplary embodiments, Marker 630 may be a wireless beacon, implemented by medium such as WiFi, Bluetooth, Near-Field Communication (NFC), or the like. AR Glasses 630 may comprise a receiver/transmitter and may communicate directly with Marker 630. As an example, Marker 630 may comprise an Ultra High Frequency (UHF) transmitter and AR Glasses 620 may comprise a UHF receiver. Additionally or alternatively, UHF transceivers may be utilized to implement two-way communication. When User 610 is about to enter the compound, AR Glasses 620 may communicate with Marker 630. Marker 630 and AR Glasses 620 may exchange messages indicating that the AR framework is implementing the altered functionality.

In some exemplary embodiments, User 610 may be an employee of the compound (e.g., a security guard), a police officer, or the like. The AR framework associated with the AR Glasses of User 610 may be configured to prevent the limitations imposed by Marker 630. In some exemplary embodiments, AR framework may be configured to receive authorization to override the instructions of Marker 630. As an example, the AR framework may send a message to the IP address indicating that Marker 630 was seen, that the restriction was obtained and that the AR framework is not imposing the restriction due to the role, permissions, tasks, or the like of User 610.

For example, FIG. 6B illustrates the AR view when the altered functionality defined by Marker 630 is implemented. The AR view may remove security-related information for the user's view, such as content of Screen 660, which may be changed and blocked from the user's view (670'). However, a TSA officer working in the security check zone may be allowed (and in fact required) to view the content of Screen 660. For the TSA officer, who may employ an AR device on his own, the restrictions may not be applied.

FIG. 6B illustrates the AR view of the real-world shown in FIG. 6A, as may be seen by User 610 via AR Glasses 620. In some exemplary embodiments, the AR framework may identify Marker 630. Marker 630 may provide privacy configurations to AR Glasses 620, the privacy configurations may impose restrictions such as requiring the execution of a redacting skin, configured to redact information. The redacting skin may be configured to redact the content of Screen 660, thereby blocking the view of Hand-grenade 670, and instead displaying an empty screen (670') displaying a black screen, displaying a censored banner, or the like. Additionally or alternatively, the redacting skin may be configured to implement security protocols such as blocking from the view of User 610 security-related information. Additionally or alternatively, the forcedly executed skin may be configured to perform operations such as but not limited to privacy-related actions, providing authority-related information, or the like. As an example, Person 640 may be undergoing a full body scanning, potentially compromising his privacy. The skin may remove Person 640 from view, may hide his face to protect his privacy, may cover any exposed skin areas to protect his modesty, or the like. Additionally or alternatively, authority-related information may provide on-screen instructions (not shown) for User 610, visually indicate TSA officers and provide authorized information about them, such as their name and rank, or the like.

Figure 7:
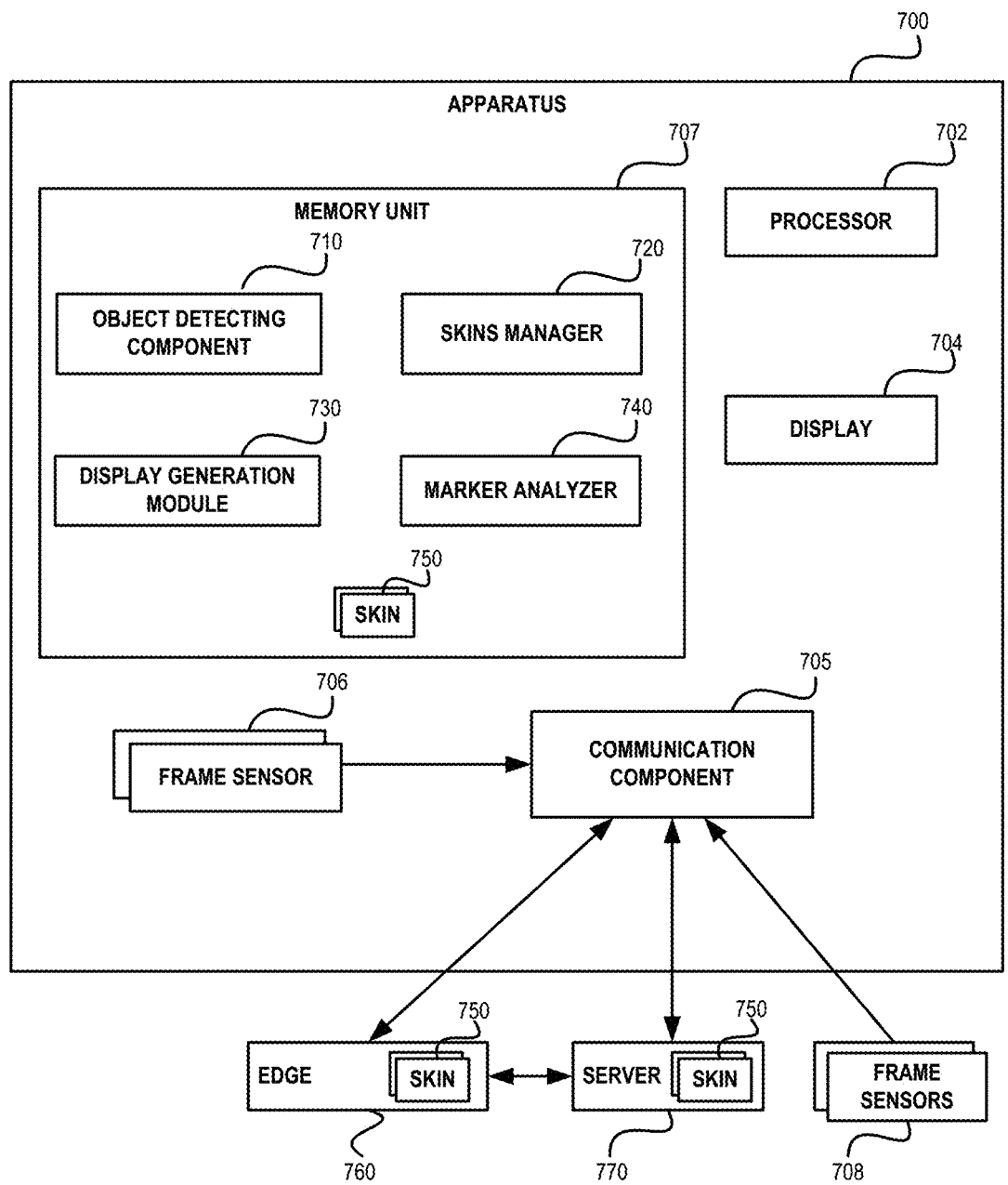
FIG. 7 shows a block diagram of an apparatus, in accordance with some exemplary embodiments of the disclosed subject matter.

Referring now to FIG. 7 showing an apparatus, in accordance with some exemplary embodiments of the disclosed subject matter.

In some exemplary embodiments, Apparatus 700 may comprise Processor 702. Processor 702 may be a Central Processing Unit (CPU), a microprocessor, an electronic circuit, an Integrated Circuit (IC) or the like. Additionally or alternatively, Apparatus 700 can be implemented as firmware written for or ported to a specific processor such as Digital Signal Processor (DSP) or microcontrollers, or can be implemented as hardware or configurable hardware such as Field Programmable Gate Array (FPGA) or Application Specific Integrated Circuit (ASIC). Processor 702 may be utilized to perform computations required by Apparatus 700 or any of its subcomponents.

It is noted that Apparatus 700 is illustrated as an apparatus that both executes the AR framework and implements the AR device. However, the disclosed subject matter is not limited to such embodiment and the AR device may be implemented externally to Apparatus 700.

In some exemplary embodiments, Apparatus 700 may comprise Display 704. Display 704 may display to a user overlay displays, thereby providing the user with an augmented view. The overlay displays may be generated based on frames captured by Frame Sensor 706, 708, representing the view of the user.

In some exemplary embodiments, Apparatus 700 may utilize frames obtained from a Frame Sensor, such as 706, 708. In some exemplary embodiments, Frame Sensor 706 may be an integral part of Apparatus 700. For example, Frame Sensor 706 may be embedded in AR glasses worn by the user, and positioned to capture the view of the user. Additionally or alternatively, Frame Sensor 708 may be external to Apparatus 700. Frame Sensor 708 may be an integral part of a mobile device, such as a cellular phone; a standalone camera; a webcam; or the like. Frames obtained from Frame Sensor 708 may be transformed to provide the expected view of the user. In some cases, a frame representing the view of the user may be created by merging outputs of different cameras and sensors.

In some exemplary embodiments, Apparatus 700 may comprise Communication Component 705. Apparatus 700 may utilize Communication Component 705 as an interface to transmit and/or receive information and instructions between Apparatus 700 and external devices, such as a Server 770, Edge 760, Frame Sensor 708, or the like. Additionally or alternatively, Communication Component 705 may be used by Apparatus 700 in order to send frames to Edge 760, to Server 770, or the like. Additionally or alternatively, Communication Component 708 may be utilized in order to obtain overlays from Edge 760, from Server 770, or the like.

Additionally or alternatively, Communication Component 705 may be utilized to communicate with an active marker (not shown). Additionally or alternatively, information from a passive marker may be obtained by Communication Component 705, such as using RFID reader. Additionally or alternatively, information may be obtained from a marker based on visual perception thereof, such as by Frame Sensor 706, 708.

In some exemplary embodiments, Edge 760 may be connected to Apparatus 700. Apparatus 700 may utilize Edge 760 in order to invoke skins thereon.

In some exemplary embodiments, Server 770 may be a remote server, a web server, a cloud server, or the like. Communication Component 705 may be connected to Server 770 directly or indirectly, such as via Edge 760, via the Internet, vis a WAN, or the like. Apparatus 700 may utilize Server 770 in order to invoke skins thereon.

Invoking skins on Edge 760 or on Server 770 may reduce power consumption by Apparatus 700 compared to invoking skins locally, on Apparatus 700. Additionally or alternatively, invoking skins on Edge 760 rather than on Server 770 may reduce latency, due to communication delay between Apparatus 700 and Edge 760 compared to that between Apparatus 700 and Server 770. In some cases, the frame or portion thereof is transmitted from Apparatus 700 to Edge 760 to allow the skin to execute. Additionally or alternatively, each computerized device—Apparatus 700, Edge 760 and Server 770 may have access to different databases. For example, a database for implementing facial recognition may require a substantial amount of data and may not be retained locally in Apparatus 700 but rather on Server 770 or on a Network-Associated Storage connected thereto. As another example, Edge 760 may have access to employee records, including portrait photos of the employees, while Server 770 may not have access to such information, which may be restricted, confidential, private, or the like. As a result, skin that requires identification of employees must be executed on Edge 760.

Additionally or alternatively, Edge 760 or Server 770 may be controlled by different entity than Apparatus 700. In some cases, it may be desired to ensure execution of a skin in a trusted execution environment, and accordingly, Edge 760 or Server 770 may be selected. It is noted, that any of Apparatus 700, Edge 760 and Server 770 may be either trusted or not trusted, independently, based on the specific implementation details.

In some exemplary embodiments, Edge 760 may be located locally in a location near the marker, such as in proximity to the security check zone of FIG. 6A. Edge 760 may be controlled by the proprietor of the security check zone or by the entity controlling it. Edge 760 may retain the redacting skin, security-related skin, privacy-related skin, or the like, that is required, as indicated by the marker (not shown) to be executed.

In some exemplary embodiments, a marker may be configured to signal to Apparatus 700 to invoke a skin on Edge 760 rather than on Server 770, or vise versa, for is privacy sake.

In some exemplary embodiments, Skin 750 may be executed locally in Memory Unit 707 or remotely on a computerized environment such Edge 760, Server 770, or the like. Choosing where to execute the skin may comprise considerations such as privacy, battery consumption, CPU consumption, data availability, or the like. As an example, a user may be in a private meeting, not wishing that data regarding the meeting is processed remotely. Additionally or alternatively, the AR glasses battery may be running out. Hence, processing remotely may require less power compared to processing locally. Additionally or alternatively, the manufacturer of the AR glasses designed a non-expensive AR glasses with a slow CPU.

In some exemplary embodiments, Apparatus 700 may comprise a Memory Unit 707. Memory Unit 707 may be persistent or volatile. For example, Memory Unit 707 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 707 may retain program code to activate Processor 702 to perform acts associated with any of the steps shown in FIGS. 2-4.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

In some exemplary embodiments, Object Detecting Component 710 may be configured to detect objects that are comprised by a frame. In some exemplary embodiments, Object Detecting Component 710 may be operatively coupled with Frame Sensors 706, 708. In some exemplary embodiments, the AR framework may utilize Object Detecting Component 710 to identify objects in the frame, and invoke skin that are registered on such objects. Additionally or alternatively, Object Detecting Component 720 may generate metadata information for each identified object. In some exemplary embodiments, Object Detecting Component 710 may detect, using a facial recognition module, an object that is a face of a person. Additionally or alternatively, Object Detecting Component 710 may be configured to use previous frames and objects detected therein to track the same objects in the analyzed frame In some exemplary embodiments, Skins Manager 720 may be configured to execute a skin, to obtain an overlay of a skin, or the like. Skins Manager 720 may be configured to retain a list of skins that are available to a user that is using Apparatus 700. In some exemplary embodiments, a skin may have been acquired, downloaded, or the like from a skin store similar to an application store for mobile applications (e.g., GOOGLE PLAY™ and APP STORE™), from a skin repository, or the like. In some exemplary embodiments, each skin may be registered on types of objects of interest. Skin Manager 710 may retain and manage such registration information to be used when an AR view is to be provided.

In some exemplary embodiments, Skins Manager 720 may be configured to invoke execution of a skin locally, remotely on Edge 760, on Server 770, or the like. The determination where to execute each skin may depend, for example, on privacy settings, on marked-based instructions, user preferences or the like.

Additionally or alternatively, Skins Manager 720 may be configured to provide an executed skin with the frame, a patch of the object of interest, metadata record, an editable section, or the like. Additionally or alternatively, Skins Manager 720 may be configured to obtain from an executed skin an overlay generated thereby, updated metadata record, information regarding added or removed objects, or the like.

In some cases, after execution of all skins is performed, Display Generation Module 730 may merge the overlays generated by the skins, one on top of the other, based on the order of the skins, to generate the display overlay that is displayed in Display 704. Additionally or alternatively, Display Generation Module 730 may implement drawing instructions from the skins on top of the merged overlays. For example, the instruction may be to draw an object in a relative location. The final location of the object may be determined by Display Generation Module 730 after all skins completed drawing on top of the frame. As an example, the object may be a label, whose location is defined to be relative to an object appearing in the frame (or in an augmented layer on top thereof). The exact positioning of the label, its final size, color, or the like, may be determined by Display Generation Module 730 taking into account other objects to be drawn (e.g., other labels), existing objects in the AR frame, or the like. It is noted that the same skin may generate an overlay to be part of the overlay display and add instructions that later on cause the creation of another object to be added to the AR frame. In between the creation of the overlay of the skin and prior to the creation of the additional object based on the instructions of the skin, other skins may be executed and generate overlays. In some exemplary embodiments, the final AR frame may comprise a first object, a second object, and a third object, where the first object is below the second object, which in turn is below the third object. The first and third objects may be added to the AR frame due to a first skin, while the second object may be added due to a second skin. Such framework provides flexibility, and enables deferring some decisions regarding added objects to a later stage, if possible.

In some exemplary embodiments, Marker Analyzer 740 may be configured to identify a marker. In some exemplary embodiments, Marker Analyzer 740 may be configured to identify the marker in the frame, such as based on a visual appearance thereof. Additionally or alternatively, Marker Analyzer 740 may be configured to identify the maker using non-visual means, such as based on audio signals, using wireless communication, or the like. In some exemplary embodiments, Marker Analyzer 740 may be configured to extract the information conveyed by the marker, such as obtain the information from a repository using an identifier of the marker, receiving the information from an active marker by communicating therewith, or the like. In some exemplary embodiments, Marker Analyzer 740 may be configured to determine an altered functionality defined by the marker and enforce such altered functionality to be performed. In some exemplary embodiments, Marker Analyzer 740 may update the metadata record to include restrictions on objects. Additionally or alternatively, Marker Analyzer 740 may instruct Skins Manager 720 to add a skin, to remove a skin, to force a skin to be executed on a desired location, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a frame sensor configured to obtain a frame, wherein the frame is associated with a field of view of a user;
a processor configured to:
execute an augmented reality framework, wherein the augmented reality framework is configured to invoke at least one skin to compute an augmented reality display for the user; wherein the augmented reality framework is configured to identify a marker in the frame, wherein in response to identifying the marker, altering functionality of the augmented reality framework, wherein said altering the functionality of the augmented reality framework comprises imposing a restriction on the at least one skin, wherein the restriction is defined by the marker.

2. The apparatus of claim 1,
wherein the augmented reality framework is configured to identify a second marker in the frame or in another frame obtained by said frame sensor; and
wherein in response to the augmented reality framework identifying the second marker, lifting the restriction.

3. The apparatus of claim 1, wherein the restriction is selected from the group consisting of:
a restriction preventing execution of the at least one skin in a remote device external to said apparatus;
a restriction requiring execution of the at least one skin in a predetermined edge device external to said apparatus;
a restriction preventing execution of the at least one skin while said apparatus is located in a predetermined location;
a restriction preventing execution of the at least one skin for a predetermined time duration; and a restriction preventing applying functionality of facial recognition of the at least one skin on a person.

4. The apparatus of claim 1 further comprising a signaling module configured to provide sensory signal that is sensible to an observer other than the user, wherein said signaling module is configured to provide a signal indicative of the restriction being imposed by the augmented reality framework.

5. The apparatus of claim 1, wherein said apparatus comprising a transmitter configured to transmit the frame; wherein the augmented reality framework is operatively coupled to said transmitter, wherein said altering the functionality comprises preventing transmission of the frame or portion thereof using said transmitter.

6. The apparatus of claim 1,
wherein the marker is associated with a marked object;
wherein said altering functionality of the augmented reality framework comprises preventing the at least one skin from processing the marked object or retaining the marked object.

7. The apparatus of claim 1, wherein the marker is not visible to a human eye.

8. The apparatus of claim 1, wherein said apparatus is embedded, at least partially, in augmented reality glasses or in augmented reality lenses.

9. An apparatus comprising:
a frame sensor configured to obtain a frame, wherein the frame is associated with a field of view of a user;
a processor configured to:
execute an augmented reality framework, wherein the augmented reality framework is configured to invoke at least one skin to compute an augmented reality display for the user; wherein the augmented reality framework is configured to identify a marker in the frame, wherein the marker identifying a second skin, wherein in response to the identification of the marker, altering functionality of the augmented reality framework so as to invoke the second skin.

10. A method comprising:
obtaining a first frame associated with a view of a user using an Augmented Reality (AR) device;
executing an original functionality on the first frame to determine a first overlay display for the first frame, wherein the first overlay display is displayed to the user by the AR device;
obtaining a second frame associated with the view of the user, wherein the second frame is later in time than the first frame;
identifying a marker in the second frame; and
in response to said identifying, determining an altered functionality based on the marker, wherein the altered functionality is different than the original functionality, wherein the altered functionality, when executed on a frame, provides a different result than a result provided by the original functionality, when executed on the frame.

11. The method of claim 10 further comprises:
obtaining a stream of frames, wherein the stream of frames comprises one or more frames that are consecutive to the second frame; and
determining a plurality of overlay displays by performing the altered functionality with respect to each frame of the stream of frames.

12. The method of claim 11, wherein determining, based on the marker, a terminating condition, wherein in response to the terminating condition occurring, restoring the functionality instead of the altered functionality, whereby new frames obtained after said restoring are processed by applying the original functionality and without applying the altered functionality.

13. The method of claim 12, wherein the terminating conditions is at least one of:
the AR device reaching a predetermined location; and
the AR framework capturing a second marker.

14. The method of claim 12 further comprises:
in response to said identifying, requesting physical access to a restricted area, wherein said requesting comprises a notification that the functionality was altered; whereby physical access is granted automatically based on the notification.

15. The method of claim 12, wherein the altered functionality comprises restricting performing of a modification to an object appearing in a frame.

16. The method of claim 12, wherein the altered functionality comprises requiring execution of a predetermined skin that is defined by the marker, wherein the predetermined skin is selected from the group consisting of a redacting skin configured to redact from the user's view portions of the frame and an authority skin controlled by an entity controlling an area associated with the marker.

17. The method of claim 12, wherein said determining the altered functionality comprises:
providing to the user a suggestion to activate a predetermined skin;
in response to a user confirmation, activating the predetermined skin, whereby the altered functionality comprises executing the predetermined skin.

18. The method of claim 10,
wherein the marker is associated with an object, wherein the marker conveys an imposed restriction with respect to the object; and
wherein said performing the altered functionality comprises imposing the imposed restriction.

19. The method of claim 10, wherein the augmented reality framework is configured to analyze the frame to identify one or more objects in the frame, wherein the at least one skin is registered on one or more object types in the augmented reality framework, whereby the augmented reality framework is configured to invoke the at least one skin in response to identifying an object of the one or more object types in the frame.

20. A computer program product comprising non-transitory computer readable medium retaining instructions, the instructions configured to cause a processor, when executing the instructions to perform:
obtaining a first frame associated with a view of a user using an Augmented Reality (AR) device;
executing an original functionality on the first frame to determine a first overlay display for the first frame, wherein the first overlay display is displayed to the user by the AR device;
obtaining a second frame associated with the view of the user, wherein the second frame is later in time than the first frame;
identifying a marker in the second frame; and
in response to said identifying, determining an altered functionality based on the marker, wherein the altered functionality is different than the original functionality, wherein the altered functionality, when executed on a frame, provides a different result than a result provided by the original functionality, when executed on the frame.

\* \* \* \* \*